United States Patent [19]

Lovegrove

[11] 4,140,400
[45] Feb. 20, 1979

[54] EXTRUDER SCREW

[75] Inventor: John G. A. Lovegrove, Stalybridge, England

[73] Assignee: Francis Shaw & Company, Manchester, England

[21] Appl. No.: 852,982

[22] Filed: Nov. 18, 1977

[51] Int. Cl.² .......................... A21C 1/06; B29B 1/10
[52] U.S. Cl. ........................................ 366/81; 366/318
[58] Field of Search .................... 366/79, 80, 89, 318, 366/323; 198/659, 661, 667; 425/208, 130

[56] References Cited

U.S. PATENT DOCUMENTS

| | | | |
|---|---|---|---|
| 3,701,512 | 10/1972 | Schippers et al. | 366/88 X |
| 3,826,477 | 7/1974 | Kunogi et al. | 366/89 X |
| 3,850,414 | 11/1974 | Scharer | 366/89 |
| 3,881,708 | 5/1975 | Carle | 366/82 |

*Primary Examiner*—Leonard D. Christian
*Attorney, Agent, or Firm*—Larson, Taylor and Hinds

[57] ABSTRACT

An extruder comprising a cylindrical extruder housing and an extruder screw extending inside the housing to define an intake section, a mixer section, and a discharge section, the screw having a basic flight which extends in an uninterrupted helix from the intake section, through a mixer section to the discharge section and the basic flight is of one diameter in the intake and discharge sections so as to be a running fit in the housing but have a diameter in the mixer section less than the one diameter so as to define in use a clearance fit in the housing and, in the mixer section, a flow advancer and diverter between appearances of the basic flight which over at least the greater part of its length is of the one diameter so as also to be a running fit in the housing so that material fed to the mixer section is caused, in the mixer section, to pass over the basic flight.

7 Claims, 3 Drawing Figures

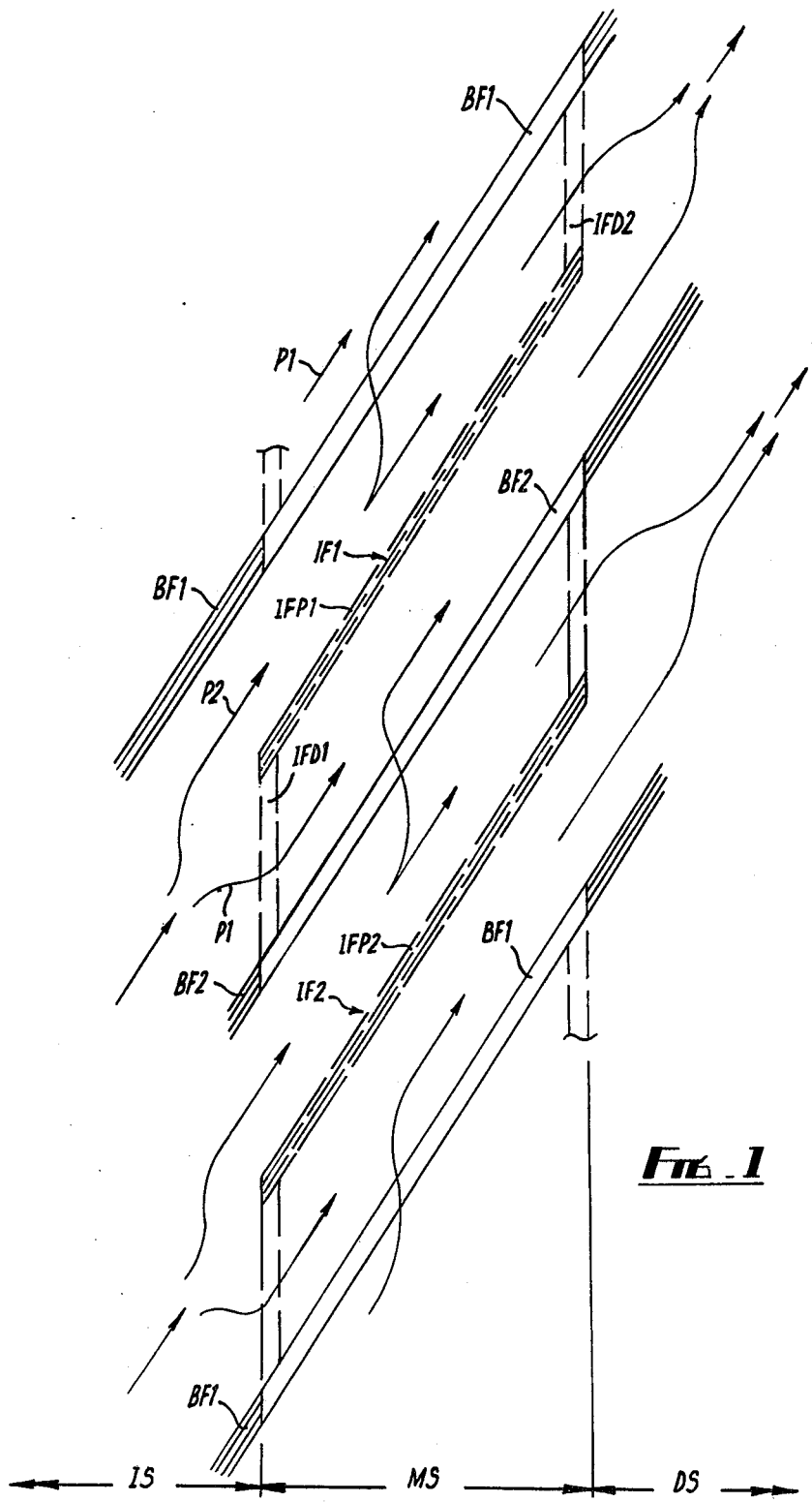

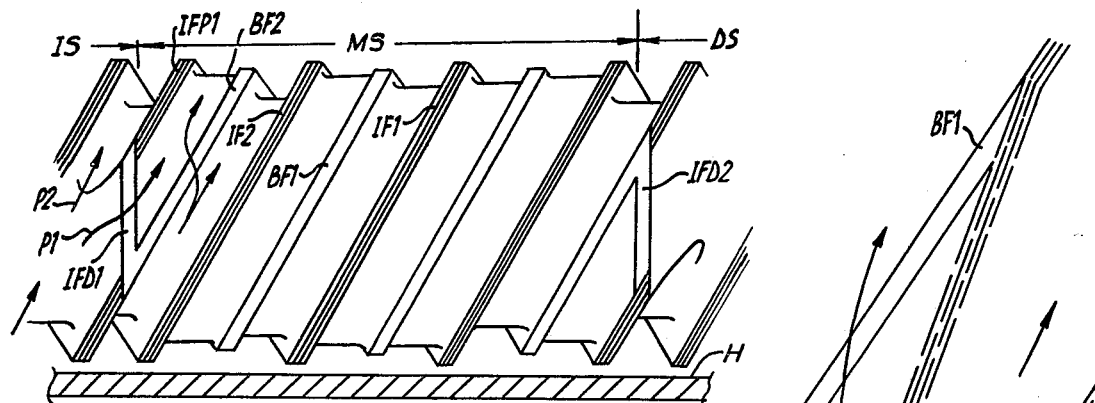
Fig. 3
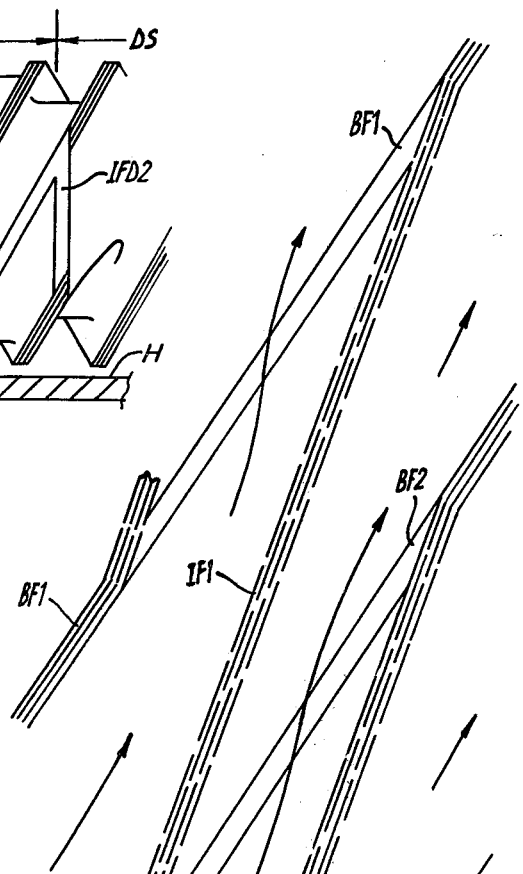
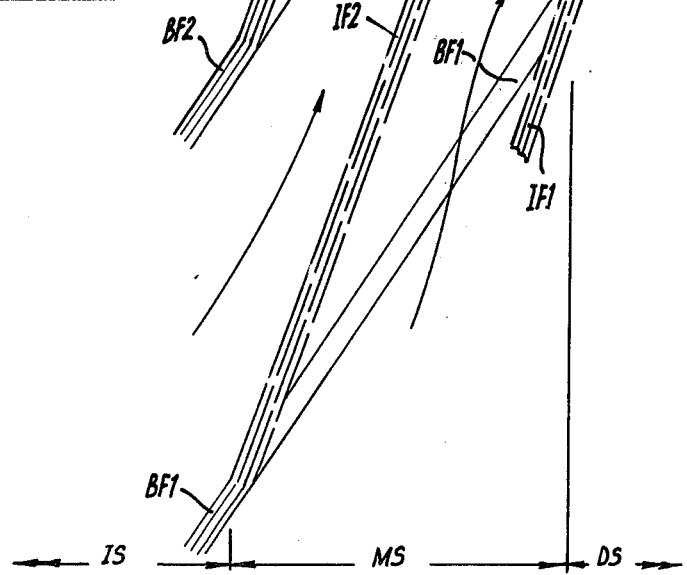
Fig. 2

EXTRUDER SCREW

BACKGROUND OF INVENTION

This invention relates to an extruder screw and to an extruder using such a screw.

It is well known, in the rubber and plastics industries, to use extruders incorporating a screw rotatable within an elongate cylindrical housing. The screw conventionally has an intake section, a transition or mixing section where material is caused to pass through a small clearance between screw and housing to subject it to a high rate of shear in a short period of time, and a discharge section. For use with rubber elastomers the mixing section causes a decrease in the viscosity of the material passing through it with the object of producing an extrudate homogeneous in respect of constituents and temperature. For use with plastics materials the mixing section is used to complete the melting of solids from the intake section with the object of producing a high quality extrudate devoid of any solids. Known extruders achieve these objects with a varying degree of success.

In one known form of screw extruder the small clearance is provided by an annular ring dam located transverse to the axis of the screw, rotating with the screw, and having a small peripheral clearance with the housing. This has the advantage of being simple but has the disadvantage of forming a severe constriction with localised and relatively intense heat generation at the dam.

In an alternative known form, some screw flights are provided which operate with a clearance-fit in the housing and are specifically designed for the flow of material over them, and other screw flights are provided which operate with a running-fit in the housing and are not specifically designed to allow flow over them. In use, the running-fit flights cause material to be forced through the clearance between clearance-fit flights and housing. With this form, the constriction in the extruder is not so severe, operating pressures are lower and heat generation more diffuse. The present invention is concerned with improvements, chiefly improvements in simplicity and ease of manufacture, in this alternative known form. It also provides a screw giving a high standard of homogeniety prior to the discharge section so that, when used for plastics, the risk of unmelted solids passing to the discharge section is greatly reduced and, when used for rubber, a high level of thermal homogeniety can be achieved.

SUMMARY OF INVENTION

The extruder screw according to the present invention, has a basic flight or flights which extend in an uninterrupted helix from an intake section, through a mixer section to a discharge section and said basic flight or flights are of one diameter in the intake and discharge sections so as to be a running fit in use in a cylindrical extruder screw housing, but have a diameter in the mixer section less than said one diameter so as to define in use a clearance-fit in said housing and, in the mixer section, a flow advancer and diverter between appearances of the basic flight or flights which over the greater part of its length or its whole length is of said one diameter so as also to be a running-fit in said housing so that material fed to the mixer section is caused, in the mixer section, to pass over the basic flight or flights.

BRIEF DESCRIPTION OF THE DRAWINGS

The invention will now be described further with reference to the accompanying drawings in which FIGS. 1 and 2 are schematic views which show two forms of extruder screw according to the invention in "flat developed" form.

FIG. 3 is an elevation of the extruder screw of FIG. 1 with the extruder housing shown diagrammatically.

DESCRIPTION OF THE PREFERRED EMBODIMENTS

In FIG. 1 an extruder screw is shown having an intake section IS, a mixer section MS and a discharge section DS. The extruder, in the form of a two start screw, has basic flights BF1 and BF2 (in full outline) which extend uninterrupted from the intake section, through the mixer section, to the discharge section (flight BF1 is given a second appearance). These flights have reduced diameter in the mixer section so as to be a clearance fit relative to the extruder housing (see "H" in FIG. 3) and a running fit outside the mixer section. The running fit has been indicated by shading on the flights and the clearance fit has been shown by absence of shading.

Between the basic flights in the mixer section there are flow advancer and diverters, or intermediate, flights IF1, IF2 (in dash outline) comprising advancer flight parts IFP1 and IFP2 parallel to the basic flights and diverter parts IFD1 and IFD2 connected to the ends of the advancer flight parts and which are angled relative to the basic flights and serve as dams allowing a portion of the material at the mixer section to pass through clearances between diverter parts and housing. To this end the flights IF1 and IF2 have the parts IFP1 and IFP2 as a running fit (shown shaded) in the extruder housing and the parts IFD1 and IFD2 (shown unshaded) as a clearance fit. The movement of material through the housing takes place in channels between flights as indicated by arrows. On entry into the mixing section the material between adjacent basic flights divides into two paths P1, P2, each of the two paths, P1, P2 lying between adjacent basic and intermediate flights. The path P1 takes a fraction of the material over a dam part IFD1 and the other path P2 takes the complementary fraction of the material either over a dam part IFD2 or over a reduced diameter section of flight BF1 to join the fraction P1 of the adjacent pair of basic flights. It will be observed that all fractions of the material pass over one, and only one, clearance fit flight or clearance fit dam.

Whilst the parts IFD1 and IFD2 are shown as having a clearance fit it is possible for them to be formed as running fits and in this event all the fed material is caused to pass through the clearance between basic flights and the housing and in doing so passes from one pathway between adjacent basic flights to the other similar pathway. Parts IFD1 and IFD2 provide, respectively, a dam at the beginning of a flow channel between flights of increasing depth in the down stream direction and a dam at the end of a flow channel between flights of decreasing depth in the downstream direction.

In FIG. 2 an extruder screw is shown having basic flights BF1, BF2 like those of FIG. 1. The extruder screw of FIG. 2 differs from that of FIG. 1 in that the intermediate flights IF1 and IF2 are straight throughout their length, that is, uninterrupted constant angle flights, and have a running fit with the housing throughout their length. The movement of material in the mixer section is then wholly from one pathway between basic flights to the adjacent pathway between basic flights, with mixing taking place as material is forced through the clearance in the basic flights.

The depth of flow channels between flights in the mixer section varies so that as mass flow in any channel decreases, because of passage of material into an adjacent channel, the depth of the channel correspondingly decreases and vice versa.

By appropriate section of the size of the clearance fits and overall length of the mixing section, it is possible, for a given duty, to determine the back pressure at the entry to the mixer section, the intensity with which material is sheared and the degree (FIG. 1) of interchannel blending.

In order to minimise the constrictive effect of the mixing sections on extruder throughout the effective flow passages across the clearance flights must have approximately the same material transfer capacity as the flow channels in the 'conventional' part of the screw. This generally means that the mixing section extends for a length of approximately three diameters along the screw and has clearance over the clearance flights in the range of 10 to 18% and preferably about 14% of the screw flow channel depths.

The optimum position of the mixing section is between ¼ and ⅔ of the length along the screw from the intake end.

Whilst the invention has been specifically described above as having two start basic flights it is possible to have other numbers of starts. A number of mixing sections could be provided on a single screw and these need not be identical.

I claim:

1. An extruder comprising a cylindrical extruder housing and an extruder screw extending inside said housing to define an intake section, a mixer section, and a discharge section, said screw having a basic flight which extends in an uninterrupted helix from the intake section, through a mixer section to the discharge section and said basic flight is of one diameter in the intake and discharge sections so as to be a running fit in said housing but have a diameter in the mixer section less than said one diameter so as to define in use a clearance fit in said housing and, in the mixer section, a flow advancer and diverter between appearances of the basic flight which over at least the greater part of its length is of said one diameter so as also to be a running fit in said housing so that material fed to the mixer section is caused, in the mixer section, to pass over the basic flight.

2. An extruder screw as claimed in claim 1 in which the advancer and diverter has three parts: one part being an advancer flight part parallel to the basic flights and of said one diameter and the other parts being diverter parts connected to the ends of the advancer flight part and angled relative to the basic flights and advancer flight part.

3. An extruder screw as claimed in claim 2 in which said diverter parts are of a diameter less than that of the advancer flight part to serve also as dams allowing, in use, a portion of the material at the mixer section to pass through the clearances between diverter parts and housing.

4. An extruder screw as claimed in claim 3 in which the diverter parts provide a dam at the beginning of a flow channel, between flights, of increasing depth in the downstream direction and a dam at the end of a flow channel, between flights, of decreasing depth in the downstream direction.

5. An extruder screw as claimed in claim 1 in which the flow advancer and diverter is an uninterrupted constant angle helix flight.

6. An extruder screw as claimed in claim 1 in which the mixing section extends for a length of substantially three diameters along the screw and has a clearance at said clearance fit in the range of 10% to 18% of the screw channel depth or maximum depth where the channel depth varies.

7. An extruder screw as claimed in claim 1 in which the mixing section is between ¼ and ⅔ of the length along the screw from the intake end.

* * * * *